United States Patent
Quiquempoix (10) Patent No.: US 11,221,977 B2
(45) Date of Patent: Jan. 11, 2022

(54) DAISY CHAIN MODE ENTRY SEQUENCE

(71) Applicant: Microchip Technology Incorporated, Chandler, AZ (US)

(72) Inventor: Vincent Quiquempoix, Divonne-les-Bains (FR)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/998,050

(22) Filed: Aug. 20, 2020

(65) Prior Publication Data
US 2021/0064563 A1 Mar. 4, 2021

Related U.S. Application Data

(60) Provisional application No. 62/893,209, filed on Aug. 29, 2019, provisional application No. 62/893,202, filed on Aug. 29, 2019, provisional application No. 62/893,216, filed on Aug. 29, 2019.

(51) Int. Cl.
*G06F 13/42* (2006.01)
*G06F 13/40* (2006.01)
*G06F 13/20* (2006.01)

(52) U.S. Cl.
CPC .......... *G06F 13/20* (2013.01); *G06F 13/4068* (2013.01); *G06F 13/4247* (2013.01); *G06F 13/4256* (2013.01); *G06F 13/4282* (2013.01); *G06F 13/4291* (2013.01)

(58) Field of Classification Search
CPC ............. G06F 13/4068; G06F 13/4247; G06F 13/4282
See application file for complete search history.

(56) References Cited

U.S. PATENT DOCUMENTS

| | | | |
|---|---|---|---|
| 5,132,635 A * | 7/1992 | Kennedy ........ | G01R 31/318558 324/73.1 |
| 10,216,678 B2 | 2/2019 | Murtaza et al. | |
| 2003/0074505 A1* | 4/2003 | Andreas .............. | G06F 13/4256 710/110 |

(Continued)

FOREIGN PATENT DOCUMENTS

WO 2007/109887 A1 10/2007 ............. G06F 13/38

OTHER PUBLICATIONS

International Search Report and Written Opinion, Application No. PCT/US2020/048338, 15 pages, dated Nov. 17, 2020.

(Continued)

*Primary Examiner* — Zachary K Huson
(74) *Attorney, Agent, or Firm* — Slayden Grubert Beard PLLC (57) ABSTRACT

A node in a daisy chain includes a serial data input port configured to receive input from an electronic device, a serial data output port configured to send output to another electronic device, a chip select input port configured to receive input from a master control unit, a timer, and an interface circuit. The interface circuit may be configured to, in a daisy chain mode, copy data received at the serial data input port to the serial data output port, and upon receipt of a changed edge of a chip select signal on the chip select input port, initiate the timer. The interface circuit may be configured to, upon the completion of a time to be determined by the timer, enter the daisy chain mode.

17 Claims, 5 Drawing Sheets

(56) References Cited

U.S. PATENT DOCUMENTS

| | | | |
|---|---|---|---|
| 2006/0123635 A1 | 6/2006 | Hurley et al. | 30/276 |
| 2007/0233903 A1 | 10/2007 | Pyeon | 710/1 |
| 2010/0280786 A1 | 11/2010 | Gorbold et al. | 702/120 |
| 2011/0252162 A1 | 10/2011 | Li et al. | 710/3 |
| 2012/0166695 A1 | 6/2012 | Venus et al. | 710/110 |
| 2013/0297829 A1 | 11/2013 | Berenbaum et al. | 710/3 |
| 2016/0098371 A1 | 4/2016 | Murtaza et al. | 710/110 |
| 2018/0276157 A1 | 9/2018 | Lofamia et al. | |

OTHER PUBLICATIONS

U.S. Non-Final Office Action, U.S. Appl. No. 16/998,097, 25 pages, dated Feb. 9, 2021.
International Search Report and Written Opinion, Application No. PCT/US2020/048330, 15 pages, dated Nov. 9, 2020.
International Search Report and Written Opinion, Application No. PCT/US2020/048321, 15 pages, dated Nov. 11, 2020.
U.S. Non-Final Office Action, U.S. Appl. No. 16/998,170, 28 pages, dated Jun. 24, 2021.
U.S. Non-Final Office Action, U.S. Appl. No. 16/998,097, 23 pages, dated Sep. 16, 2021.

* cited by examiner

DAISY CHAIN MODE ENTRY SEQUENCE

PRIORITY

The present disclosure claims priority to U.S. Provisional Patent Application No. 62/893,209, filed Aug. 29, 2019, to U.S. Provisional Patent Application No. 62/893,202 filed Aug. 29, 2019, and to U.S. Provisional Patent Application No. 62/893,216 filed Aug. 29, 2019, the contents of which are hereby incorporated in their entirety.

FIELD OF THE INVENTION

The present disclosure relates to communication between microcontrollers and, more particularly, to daisy chain mode entry sequence.

BACKGROUND

Microcontroller units (MCUs) and other electronic devices communicate in a variety of ways. However, their number of ports of communication is limited and the number of devices to connect to may be much larger than the number of ports. One way to optimize the usage of the MCU ports a daisy chain configuration, wherein such devices are connected one after the other to each other, and data is propagated from one device to the next device. Daisy chain configurations are often used for large backplane applications and may reduce the number of wires needed, compared to configurations wherein data transfer is in parallel between such devices. A daisy chain configuration uses n ports, wherein n is the number of bits of data to be communicated between any two devices. In the case of serial communication, such as serial peripheral interface (SPI), n may be one. In contrast, wherein a parallel configuration may require m ports, or m times n ports, wherein m is the number of devices that will communicate data to each other. If the number of ports on the device is limited, a daisy chain configuration may help conserve the usage of ports.

Daisy chain configuration may require an interface protocol that facilitates transferring commands and data throughout the daisy chain from one device to another, and therefore a daisy chain mode where this command and data transfer can be processed.

Inventors of embodiments of the present disclosure have discovered that placing a given device in daisy chain mode may interfere with other operations. This may result from operation of the device in daisy chain mode with an interface protocol that is not necessarily interoperable with a normal or standard main protocol used when devices are not in daisy chain mode. In addition, successfully placing a device into daisy chain mode may depend on proper transfer of data or commands among the daisy chain connected devices. In harsh environments where such data or commands may be corrupted or otherwise interfered with, improper configuration can result. Thus, inventors of embodiments of the present disclosure have discovered that it may be desirable to ensure that daisy chain mode is not entered accidentally or due to errors because of harsh environment or noise. Furthermore, inventors of embodiments of the present disclosure have discovered that it may be desirable to cause daisy chain mode entry without dependence upon data and command propagation throughout the daisy chain. In addition, inventors of embodiments of the present disclosure have discovered that it is desirable for a system with daisy chained devices to be able to verify that all devices in the daisy chain have successfully entered daisy chain mode.

In some daisy-chain configurations, connections between devices may be based on electrically erasable programmable read-only memory (EEPROM), one-time programming (OTP) settings, or an external pin logic setting. However, inventors of embodiments of the present disclosure have recognized that such solutions might remove the possibility of switching between normal and daisy chain mode, and often need to differentiate between normal mode components and daisy chain mode components. Therefore it may be desirable to switch between a normal mode of operation—wherein each given device includes an active port of communication with a master device—and a daisy chain mode where each device includes an active port of communication to the devices immediately up and immediately down the daisy chain. Inventors of embodiments of the present disclosure have discovered solutions that may address one or more of these issues, enable daisy chain mode for multiple devices, and check if all devices are in a daisy chain mode.

SUMMARY

Embodiments of the present disclosure include an apparatus, such as a node in a daisy chain. The apparatus may include a serial data input port configured to receive input from an electronic device in the daisy chain. The apparatus may include a serial data output port configured to send output to another electronic device in the daisy chain. The apparatus may include a chip select input port configured to receive input from a master control unit of the daisy chain. The apparatus may include a timer. The apparatus may include an interface circuit, configured to, in a daisy chain mode, copy data received at the serial data input port to the serial data output port. The interface circuit may be configured to, upon receipt of a changed edge of a chip select signal on the chip select input port, initiate the timer. The changed edge of the chip select signal may be from a first logic level to a second logic level. The interface circuit may be configured to, upon the completion of a time to be determined by the timer, enter the daisy chain mode.

Embodiments of the present disclosure may include an apparatus, such as a master control unit, in a daisy chain of electronic devices. The apparatus may include a serial data output port configured to send output data to an electronic device of the daisy chain. The apparatus may include a serial data input port configured to receive input data from another electronic device of the daisy chain. The apparatus may include a chip select output port configured to send output to the electronic devices connected in the daisy chain, including the electronic device and the other electronic device. The apparatus may include an interface circuit configured to determine to set the plurality of electronic devices in a daisy chain mode. Each electronic device may be configured to propagate received data from a previous electronic device in the daisy chain to a subsequent electronic device in the daisy chain. The interface circuit may be configured to, based on the determination to set the plurality of electronic devices into the daisy chain mode, issue a changed edge on a chip select signal on the chip select output port, wherein the changed edge of the chip select signal is from a first logic level to a second logic level. The interface circuit may be configured to, based on the determination to set the plurality of electronic devices into the daisy chain mode, send output data to be used in a command to the electronic device through the serial data output port.

Embodiments of the present disclosure may include a method. The method may be for a node in a daisy chain of electronic devices. The method may include receiving input from an electronic device through a serial data input port. The method may include sending output to another electronic device through a serial data output port. The method may include receiving input from a master control unit through a chip select input port. The method may include, in a daisy chain mode, copying data received at the serial data input port to the serial data output port. The method may include, upon receipt of a first changed edge of a chip select signal on the chip select input port, initiating a timer, wherein the changed edge of the chip select signal is from a first logic level to a second logic level. The method may include, upon the completion of a time to be determined by the timer, entering the daisy chain mode.

Embodiments of the present disclosure may include a method. The method may be for a master control unit in a daisy chain of electronic devices. The method may include, through a serial data output port, sending output data to an electronic device of the daisy chain. The method may include, through a serial data input port, receiving input data from another electronic device in the daisy chain. The method may include, through a chip select output port, sending output to the electronic devices connected in a daisy chain. The method may include determining to set the electronic devices in a daisy chain mode, wherein each electronic device is configured to propagate received data from a previous electronic device in the daisy chain to a subsequent electronic device in the daisy chain. The method may include, based on the determination to set the electronic devices into the daisy chain mode, issuing a changed edge on a chip select signal on the chip select output port. The changed edge of the chip select signal is from a first logic level to a second logic level. The method may include, based on the determination to set the electronic devices into the daisy chain mode, sending output data to be used in a command to the electronic device through the serial data output port.

DETAILED DESCRIPTION

Embodiments of the present disclosure may include a system. The system may include electronic devices connected to one another in a daisy chain fashion. The electronic devices may include a master electronic device or master control unit and any suitable number of other electronic devices. The electronic devices and master control units may be implemented in the same manner or in a different manner. The electronic devices and master control units may each include interface circuits. The interface circuits may be implemented in any suitable combination of analog circuitry, digital circuitry, or instructions for execution by a processor. The interface circuits may handle communication between electronic devices and master control units. A master control unit may be connected to each electronic device in any suitable manner. For example, the master control unit may be connected to each electronic device via a clock signal connection. The master control unit may be connected to each electronic device via a chip select signal connection. The master control unit may be connected to a first electronic device in the daisy chain through a serial data output port of the master control unit and a serial data input port of the first electronic device. A given electronic device of the daisy chain may be connected to another electronic device of the daisy chain through a serial data output port of the given electronic device and a serial data input port of the other electronic device. The master control unit may be connected to a last electronic device in the daisy chain through a serial data input port in the master control unit and a serial data output port in the electronic device.

In combination with any of the above embodiments, an embodiment may include an apparatus, such as an electronic device in the daisy chain. The electronic device may include a serial data input port configured to receive input from a first, other electronic device or a master control unit. The electronic device may include a serial data output port configured to send output to a second, other electronic device. The electronic device may include a chip select input port configured to receive input from an electronic device such as a master control unit.

The electronic device may include a timer. The electronic device may include an interface circuit configured to, in a daisy chain mode, copy data received at the serial data input port to the serial data output port. The interface circuit may be configured to, upon receipt of a first changed edge of a chip select signal on the chip select input port, initiate the timer. The first changed edge of the chip select signal may be from a first logic level to a second logic level. The interface circuit may be configured to, upon the completion of a time to be determined by the timer, enter the electronic device into daisy chain mode. In combination with any of the above embodiments, the interface circuit may be further configured to stop the timer and not enter the daisy chain mode upon a second changed edge of the chip select signal before the completion of time. In combination with any of the above embodiments, the interface circuit may be further configured to stop the timer and not enter the daisy chain mode upon a changed clock input before the completion of time.

In combination with any of the above embodiments, the interface circuit may be further configured to exit the daisy chain mode based at least upon receipt of a second changed edge of the chip select signal on the chip select input port, wherein the second changed edge of the chip select signal is from the second logic level to the first logic level.

In combination with any of the above embodiments, the timer may be configured to be stopped based at least upon receipt of a second changed edge of the chip select signal on the chip select input port, wherein the second changed edge of the chip select signal is from the second logic level to the first logic level.

In combination with any of the above embodiments, the interface circuit may be further configured to output a default value to the serial data output port after receipt of the first changed edge of the chip select signal on the chip select input port and before the timer has determined the time to be determined. In combination with any of the above embodiments, the electronic device may further include a shared clock input port configured to receive a shared clock signal. The interface circuit may be further configured to enter the daisy chain mode based on a determination that the shared clock signal is unchanged while the timer is enabled and running. In combination with any of the above embodiments, the interface circuit may be further configured to exit the daisy chain mode and enter a normal mode upon receipt of a second changed edge of the chip select signal on the chip select input port, wherein the second changed edge of the chip select signal is from the second logic level to the first logic level. In combination with any of the above embodiments, the interface circuit may be further configured to, in the normal mode after existing the daisy chain mode, apply a high impedance to the serial data output port.

In combination with any of the above embodiments, the master control unit may be configured to issue commands and data associated with the commands to the electronic devices. When in daisy chain mode, electronic devices may generally propagate information received on their serial data input port to their serial data output port. The master control unit may include a serial data output port configured to send output data to a first electronic device at the top of the daisy chain, a serial data input port configured to receive input data from a second electronic device at the end of the daisy chain, and a chip select output port configured to send output to the electronic devices, and an interface circuit. The interface circuit may be configured to determine to set the plurality of electronic devices in a daisy chain mode, wherein each electronic device is configured to propagate received data from a previous electronic device in the daisy chain to a subsequent electronic device in the daisy chain. The interface circuit may be configured to, based on the determination to set the electronic devices in the daisy chain to daisy chain mode, issue a first changed edge on a chip select signal on the chip select output port. The first changed edge of the chip select signal may be from a first logic level to a second logic level. The interface circuit may be configured to, based on the determination to set the plurality of electronic devices into the daisy chain mode, send output data to be used in a command to the first electronic device through the serial data output port. In combination with any of the above embodiments, the interface circuit may be configured to determine whether the input data received from the second electronic device through the serial data input port matches an expected data. The expected data may be based on the output data, The interface circuit may be configured to, based on a determination that the input data matches the expected data, determine that the daisy chain is working correctly. Otherwise, the interface circuit may be configured to determine that the daisy chain is working incorrectly and to take any suitable corrective action.

In combination with any of the above embodiments, the interface circuit may be configured to, based on the determination that the daisy chain is working incorrectly, issue a second changed edge on the chip select signal on the chip select output port. The second changed edge of the chip select signal may be from the second logic level to first logic level. In combination with any of the above embodiments, the interface circuit may be configured to, after issuing the second changed edge, issue a third changed edge on the chip select signal on the chip select output port. The third changed edge of the chip select signal may be from the first logic level to second logic level. In combination with any of the above embodiments, the interface circuit may be configured to, after issuing the third changed edge, resend the output data to be used in the command to the first electronic device through the serial data output port. In combination with any of the above embodiments, the apparatus may include a timer. In combination with any of the above embodiments, the interface circuit may be configured to, based on the determination to set the electronic devices into the daisy chain mode, initiate the timer. In combination with any of the above embodiments, the interface circuit may be configured to, when the timer elapses, perform the determination of whether the input data received from the second electronic device through the serial data input port matches the expected data.

In combination with any of the above embodiments, the interface circuit may be configured to determine to set the electronic devices into a normal mode and cause the electronic devices to exit the daisy chain mode. In combination with any of the above embodiments, the interface circuit may be configured to, based on the determination to set the electronic devices into the normal mode and exit the daisy chain mode, issue a second changed edge on the chip select signal on the chip select output port, wherein the second changed edge of the chip select signal is from the second level to the first logic level.

In combination with any of the above embodiments, the interface circuit may be configured to output a default value, such as zero, to the serial data output port after receipt of the first changed edge of the chip select signal on the chip select input port and before the timer has elapsed.

Figure 1:
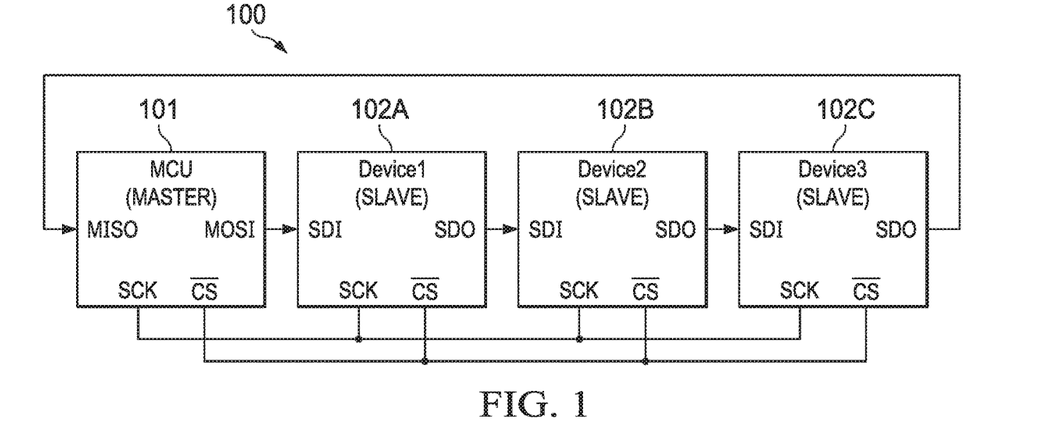
FIG. 1 is an illustration of a system with daisy chained electronic devices, according to embodiments of the present disclosure.

FIG. 1 is an illustration of a system 100 with daisy chained electronic devices, according to embodiments of the present disclosure. Any suitable electronic devices may be daisy chained. For example, a microcontroller unit (MCU) 101 may be a master or head node in system 100. In another example, additional electronic devices 102A, 102B, 102C may be slave or sub nodes in system 100. Any suitable number and type of electronic devices may be used. For example, in some implementations, 256 different electronic devices may be daisy chained in system 100. The electronic devices of system 100, such as MCU 101 and electronic devices 102, may be implemented in a same manner or each in a different manner.

System 100 may be implemented within any suitable context. For example, system 100 may be implemented within a data sensor array, vehicle, control system, industrial automation, home automation, factory, test and validation system, or any other suitable application. System 100 may be configured to read or write data via daisy chained serial interfaces in order to accomplish or further any suitable task in such contexts.

MCU 101 may include inputs and outputs, including master in slave output (MISO), configured to receive data from an end of the daisy chain of system 100, such as output of electronic device 102C. MISO may be received through a MISO port. The MISO port may be a serial data input port configured to receive input from other electronic devices. MCU 101 may include an output for master output slave input (MOSI). MOSI may be sent through a MOSI port. The MOSI port may be a serial data output port configured to send output to other electronic devices. For example, MCU 101 which may be configured to send data to a first slave electronic device of the daisy chain of system 100, such as input to electronic device 102A, through the MO SI port. MCU 101 may include a port or pin(s) for a shared clock (SCK), which may be used as a shared clock output port to send a shared clock signal for timing of transfers. MCU 101 may be configured to generate SCK, and it may be routed to each of the other electronic devices 102. MCU 101 may include a port or pin(s) for a chip select (CS) signal, which may be used to communicate various information as discussed below. The CS port may be a chip select output port configured to send input from a master device such as MCU 101 to electronic devices 102. MCU 101 may be configured to generate the CS signal, and it may be routed to each of the other electronic devices 102. The CS signal may be manifested or evaluated in terms of an inverted or logical negative version of the CS signal, denoted as nCS. Any of MCU 101 or electronic devices 102 may be configured to generate a CS/nCS signal, and the CS/nCS signal may be routed to each of the other electronic devices 102 and MCU 101.

Electronic devices 102 may each include a serial data input (SDI) port or pin(s) configured to receive data input from MCU 101 or another one of electronic devices 102. The SDI port may be a serial data input port configured to receive input from other electronic devices. Electronic devices 102 may each include a serial data output (SDO) port or pin(s) configured to send data output to MCU 101 or another one of electronic devices 102. The SDO port may be a serial data output port configured to send output to other electronic devices. Electronic devices 102 may include a shared clock input port to receive an SCK signal and a chip select input port to receive CS or nCS signals. Electronic devices 102 and MCU 102 may further include other suitable number and kind of ports.

MCU 101 and electronic devices 102 may use any suitable communication protocol, such as SPI. MCU 101 may be configured to issue commands or data to electronic devices 102. Such commands may be issued serially through the MOSI port of MCU 101 to the SDI port of electronic device 102A, which may in turn serially propagate the command or data on to other electronic devices such as electronic device 102B through the SDO port of electronic device 102A to the SDI port of electronic device 102B. The width of the command may specify how many serial pulses of data are to be used to represent the command. In turn, electronic device 102B may serially propagate the command or data on to other electronic devices such as electronic device 102C through the SDO port of electronic device 102B to the SDI port of electronic device 102C. In turn, electronic device 102C may serially propagate the command or data on to other electronic devices such as another electronic device (not shown) or to MCU 101 through the SDO port of electronic device 102C to the MISO port of MCU 101.

The commands may be, for example, to read or write data. The data and a source of the data that is to be read may be designated by the command. Each electronic device 102 may monitor its SDI port for data read from others of electronic devices 102 or MCU 101 (whichever is connected further up the daisy chain) and propagate such data read from others of electronic devices 102 or MCU 101 through its SDO port. Moreover, each electronic device may perform the designated read command, and then add its data to those of other electronic devices 102 or MCU 101 by sending its data through its SDO port.

Data that is to be written and a destination of the data may be designated by the command. MCU 101 may send the data to be written to a first instance of electronic device 102 in the daisy chain. Each electronic device 102 may monitor its SDI port for data received from others of electronic devices 102 or MCU 101 (whichever is connected further up the daisy chain) and propagate such data from others of electronic devices 102 through its SDO port. Such data may be the data to be written. Each electronic device 102 may write the data.

Performing daisy chain mode activities in electronic devices 102 may interfere with other operations of electronic device 102. Moreover, propagation of data between electronic devices 102 need not be performed all of the time, even if such data could be ignored if not needed. Thus, electronic devices 102 may be configured to be selectively put into daisy chain mode or into normal mode. In daisy chain mode, each electronic device 102 may propagate received data at its SDI to its SDO. Moreover, in daisy chain mode, each electronic device 102 may further perform reads of data and add it to the received data at its SDI to propagate to its SDO, or writes of data with the received data at its SDI, according to various commands as discussed above.

A given electronic device 102 may enter daisy chain mode or exit daisy chain mode upon any suitable signals or commands. Such signals or commands may be provided by MCU 101. MCU 101 may determine to set electronic devices 102 in daisy chain mode based upon any suitable condition or criteria, such as a condition that each electronic device 102 is to write a given value to its memory or that each electronic device 102 is to provide data from a component or memory therein to MCU 101.

In one embodiment, a given electronic device 102 may enter daisy chain mode after receiving a signal and then expiration of a certain amount of time in which it has not received a shared clock signal pulse from MCU 101. Such a shared clock signal may be SCK. Electronic device 102 may include its own clock, timers, or any other suitable mechanism to determine the time for which it has not received a shared clock signal pulse from MCU 101. Electronic device 102 may be configured to observe an amount of time that the shared clock signal has remained high, remained low, or remained high or low without transition. In another embodiment, the signal upon which the time begins to be measured may be a changed edge of a CS or nCS signal on the CS port of the given electronic device 102. The changed edge of the CS or nCS signal may be from one logic level to another. Any suitable number and kind of logic levels may be used, such as logic low or zero and logic high or one, physically implemented by, for example 0 V and 3.3 V. The entry of the given electronic device 102 based upon the changed edge of the CS or nCS signal followed by a certain amount of time without a changed edge of the SCK signal may constitute a daisy chain entry sequence for the given electronic device 102.

The duration of the certain amount may be set by, for example, a timer. The timer may be initiated upon any suitable signal or command. For example, the timer may be initiated after detection of a changed edge of a CS or nCS signal on a CS port on electronic device 102. In a further embodiment, the timer may be interrupted, and not trigger entry into daisy chain mode, upon any suitable changed signal to the given instance of electronic device 102. For example, the timer may be interrupted, and not trigger entry into daisy chain mode, upon a changed edge of a signal on the SCK port of electronic device 102, or another changed edge of a CS or nCS signal on its CS port. Such another changed edge of a CS or nCS signal on its CS port may include a rising edge on an nCS signal on its CS port. Such another changed edge of a CS or nCS signal or the SCK signal may represent MCU 101 issuing a cancellation of the attempted daisy chain mode entry.

Thus, based upon the determination to set electronic devices 102 in a daisy chain mode, MCU 101 may issue a changed edge of a CS or nCS signal to the CS ports of electronic devices. Further, based upon the determination to set electronic devices 102 in a daisy chain mode, MCU 101 may send output commands and data through its MOSI to the SDI input of a first electronic device 102 in the daisy chain.

In one embodiment, a given electronic device 102 may exit daisy chain mode based upon any suitable condition and using any suitable mechanism. This may include, for example, a reset command issued by MCU 101. In another example, a given electronic device 102 may exit daisy chain mode based upon another changed edge of a CS or nCS signal on its CS port, which may include a rising edge on an nCS signal on its CS port. In another example, the exit maybe performed after a timer located in each electronic device 102 has elapsed.

Figure 2:
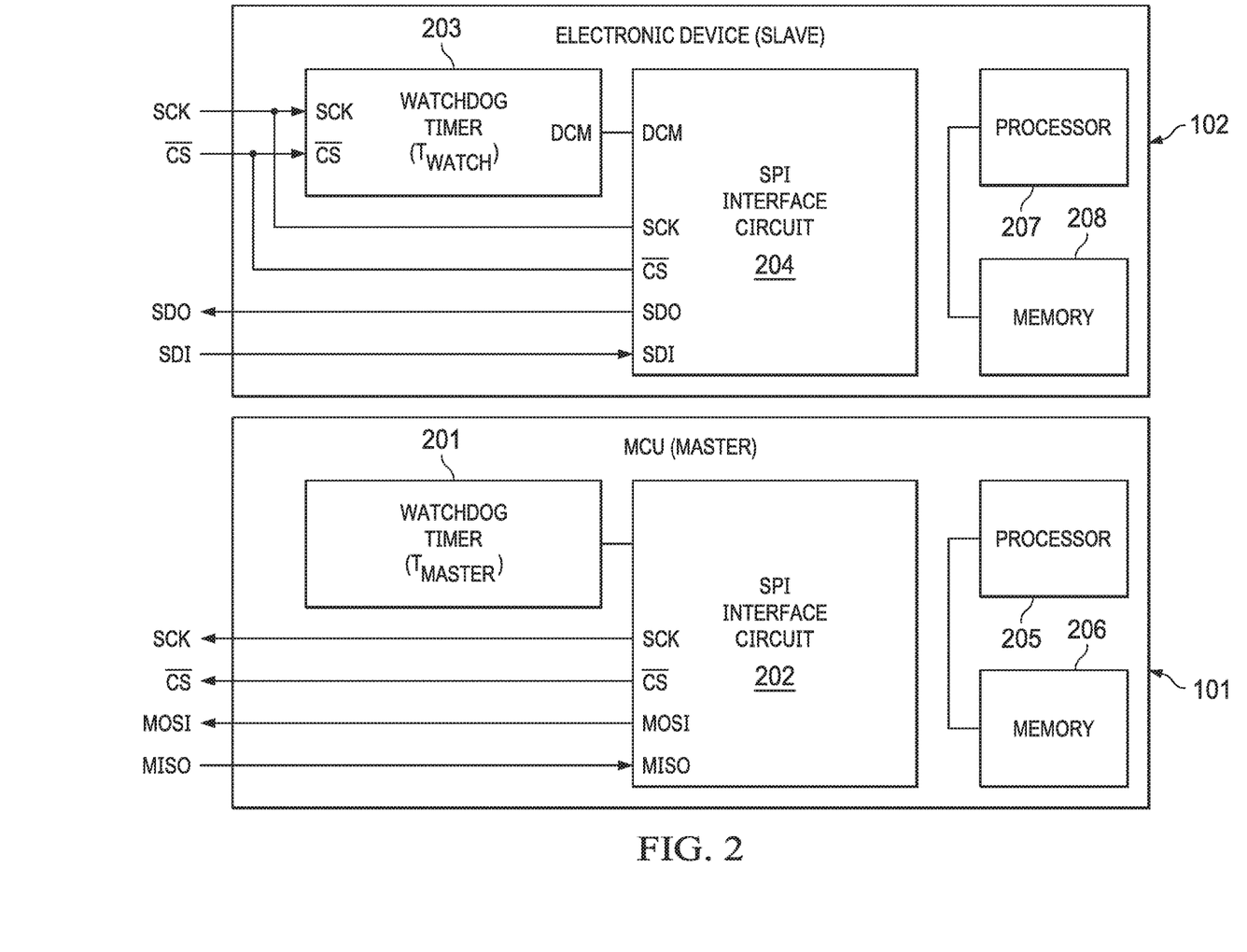
FIG. 2 is a more detailed illustration of a master control unit and an electronic device, according to embodiments of the present disclosure.

FIG. 2 is a more detailed illustration of MCU 101 and electronic device 102, according to embodiments of the present disclosure.

MCU 101 may include a processor 205 communicatively coupled to a memory 206. Processor 205 may include any suitable processor, and memory 206 may be any suitable persistent or non-persistent memory. Not shown are any suitable number and kind of peripherals or auxiliary circuits used by MCU 101 to perform whatever other tasks MCU 101 is designed to perform, such as an analog to digital converter (ADC) or register. Moreover, processor 205 may be configured to load and execute instructions stored in memory 206 in order to perform any suitable task.

Electronic device 102 may include a processor 207 communicatively coupled to a memory 208. Processor 207 may include any suitable processor, and memory 208 may be any suitable persistent or non-persistent memory. Not shown are any suitable number and kind of peripherals or auxiliary circuits used by electronic device 102 to perform whatever other tasks electronic device 102 is designed to perform, such as an ADC or register. Moreover, processor 207 may be configured to load and execute instructions stored in memory 208 in order to perform any suitable task.

MCU 101 and electronic device 102 may each include respective SPI interface circuits 202, 204. SPI interface circuits 202, 204 may be implemented by analog circuitry, digital circuitry, logic, instructions for execution by a processor (such as processor 205, 207, respectively), or any suitable combination thereof. The specific implementation of SPI interface circuits 202, 204 may be the same or different with respect to one another. In one embodiment, SPI interface circuits 202, 204 may be implemented in a same manner and configured to operate differently based upon, for example, a register or system or user setting. SPI interface circuit 202 may be configured to operate for the purposes of a master node such as MCU 101 and SPI interface circuit 204 may be configured to operate for the purposes of an electronic device such as electronic device 102.

In MCU 101, SPI interface circuit 202 may be configured to generate outputs to SCK and CS ports. SPI interface circuit 202 may be configured to generate outputs to send commands or data to electronic devices 102 through its MOSI port. SPI interface circuit 202 may be configured to receive data through its MISO port. SPI interface circuit 202 may be configured to generate outputs to SCK and CS ports to instruct electronic devices 102 to enter or exit daisy chain mode.

In electronic device 102, SPI interface circuit 204 may be configured to monitor inputs from SCK and CS ports of electronic device 102. In one embodiment, SPI interface circuit 204 may be configured to monitor the CS port for indications of whether to enter or exit daisy chain mode. In addition, when in daisy chain mode, SPI interface circuit 204 may be configured to monitor inputs from the SDI port for data to propagate to the SDO port. Such data may also be written by SPI interface circuit 204, depending upon whether a write command has been received. Furthermore, when performing a read command, SPI interface circuit 204 may be configured to read data from a designated source and provide its own data through the SDO port.

In one embodiment, SPI interface circuit 204 may be configured to monitor inputs to enter one or more daisy chain modes, wherein electronic device 102 is configured to propagate data received through its SDI port through output on its SDO port as part of a read or write command. As discussed above, SPI interface circuit 202 may monitor the CS port for an nCS falling edge to enter daisy chain mode. Moreover, SPI interface circuit 204 may be configured to wait for a specified duration of time after detecting the nCS falling edge signal on the CS port before entering daisy chain mode.

In another embodiment, SPI interface circuit 204 may be configured to monitor inputs to determine whether to return to a normal mode of operation, wherein electronic device 102 performs its regularly scheduled tasks. As discussed above, SPI interface circuit 204 may monitor for any suitable indication to return to a normal mode of operation.

Electronic device 102 may include any suitable number and kind of mechanisms for use with the operations of SPI interface circuit 204. For example, SPI interface circuit 204 may utilize a watchdog timer 203. Watchdog timer 203 may be implemented by any suitable combination of digital circuitry, analog circuitry, and logic, or any combination thereof. For example, watchdog timer 203 may be implemented as a timer that counts down each clock cycle from a set value and generates an alert, signal, or other indicator that the number of clock cycles—and thus time—has elapsed. Watchdog timer 203 may be implemented as a timer that counts up each clock cycle from zero to a set value and generates an alert, signal, or other indicator that the number of clock cycles—and thus time—has elapsed. Watchdog timer 203 may be implemented as a timer that counts until a rollover event and thus periodically generates an alert, signal, or other indicator that a certain amount of time has elapsed. Watchdog timer 203 may be implemented by comparing the discharge of a charged capacitor, using the known discharge rate from the capacitor, and comparing the charge of the capacitor with a threshold value. Moreover, watchdog timer 203 may be implemented as a timer without need of receiving CS or SCK signals. Although shown separately from SPI interface circuit 204, watchdog timer 203 may be incorporated within SPI interface circuit 204. SPI interface circuit 204 may be configured to set watchdog timer 203 upon detection of an nCS rising edge signal on the CS port, and to detect if and when watchdog timer 203 expires. The value set in watchdog timer 203 may be a time period for which electronic device 103 will wait after detection of an nCS rising edge signal on the CS port without reception of a SCK clock changed edge or additional nCS changed edge before entered daisy chain mode. Such a time period may be given as TWatch. If a changed edge on the SCK port or a rising edge of an nCS signal on the CS port are detected before expiration of watchdog timer 203, SPI interface circuit 204 may be configured to return to normal mode. Routing of SCK or CS signals may be provided directly to watchdog timer 203 or through SPI interface circuit 204.

MCU 101 may include any suitable number and kind of mechanisms for use with the operations of SPI interface circuit 202. For example, SPI interface circuit 202 may utilize a watchdog timer 201. Watchdog timer 201 may be implemented by any suitable combination of digital circuitry, analog circuitry, and logic, such as a timer that counts down each clock cycle from a set value and generates an alert, signal, or other indicator that the number of clock cycles—and thus time—has elapsed. Although shown separately from SPI interface circuit 202, watchdog timer 201 may be incorporated within SPI interface circuit 202. SPI interface circuit 202 may be configured to set watchdog timer 201 upon issuance of commands or CS signals to electronic devices 102. The value set in watchdog timer 201 may be a time period for which MCU 101 will wait after issuance of commands or CS signals to take further action, or to verify that the commands or CS signals were received correctly. Such a time period may be given as TMaster. Routing of SCK or CS signals may be provided directly to watchdog timer 201 or through SPI interface circuit 202.

SPI interface circuit 204 may be configured to, in a daisy chain mode, copy data received at the SDI port to the SDO port SPI interface circuit 204 may be configured to, upon receipt of a first changed edge on the CS port, initiate watchdog timer 203. SPI interface circuit 204 may be configured to, upon the completion of a time to be determined by watchdog timer 203, enter electronic device 102 into daisy chain mode. SPI interface circuit 204 may be configured to stop watchdog timer 203 and not enter the daisy chain mode upon a second changed edge of the CS port before the completion of time. SPI interface circuit 204 may be configured to stop watchdog timer 203 and not enter the daisy chain mode upon a changed clock input on the SCK port before the completion of time.

SPI interface circuit 204 may be configured to enter the daisy chain mode based at least upon receipt of a second changed edge of the chip select signal on the CS port, wherein the second changed edge is from the second logic level to the first logic level. SPI interface circuit 204 may be configured to stop watchdog timer 203 based at least upon receipt of a second changed edge of the chip select signal on the chip select input port, wherein the second changed edge of the chip select signal is from the second logic level to the first logic level. SPI interface circuit 204 may be configured to output a default value to the SDO port after receipt of the first changed edge on the CS port and before watchdog timer 203 has finished determining the time to be determined. SPI interface circuit 204 may be configured to enter the daisy chain mode based on a determination that the SCK port signal is unchanged while watchdog timer 203 is enabled and running. SPI interface circuit 204 may be configured to cause electronic device 102 to exit the daisy chain mode and enter a normal mode upon receipt of a second changed edge on the CS port. SPI interface circuit 204 may be configured to, in the normal mode after existing the daisy chain mode, apply a high impedance to the SDO port.

MCU 101 may be configured to issue commands and data associated with the commands to electronic devices 102. When in daisy chain mode, electronic devices 102 may generally propagate information received on their SDI port to their SDO port. SPI interface circuit 202 may be configured to determine to set electronic devices 102 into a daisy chain mode, wherein each electronic device 102 is configured to propagate received data from a previous electronic device 102 in the daisy chain to a subsequent electronic device 102 in the daisy chain. SPI interface circuit 202 may be configured to, based on the determination to set the electronic devices 102 in the daisy chain to daisy chain mode, issue a first changed edge its CS port to electronic devices 102. The first changed edge of the chip select signal may be from a first logic level to a second logic level. SPI interface circuit 202 may be configured to, based on the determination to set electronic devices 102 into the daisy chain mode, send output data to be used in a command to a first electronic device 102 of the daisy chain through the MOSI port. SPI interface circuit 202 may be configured to determine whether the input data received from the last electronic device 102 of the daisy chain through the MISO port matches an expected data. The expected data may be based on the output data. SPI interface circuit 202 may be configured to, based on a determination that the input data matches the expected data, determine that the daisy chain is working correctly. Otherwise, SPI interface circuit 202 may be configured to determine that the daisy chain is working incorrectly and to take any suitable corrective action.

In combination with any of the above embodiments, SPI interface circuit 202 may be configured to, based on the determination that the daisy chain is working incorrectly, issue a second changed edge on the CS port to electronic devices 102. The second changed edge of the chip select signal may be from the second logic level to first logic level. SPI interface circuit 202 may be configured to, after issuing the second changed edge, issue a third changed edge on the CS port. The third changed edge may be from the first logic level to second logic level. SPI interface circuit 202 may be configured to, after issuing the third changed edge, resend the output data to be used in the command to the first electronic device 102 of the daisy chain through the MOSI port. SPI interface circuit 202 may be configured to, based on a determination to set electronic devices 102 into the daisy chain mode, initiate watchdog timer 201. SPI interface circuit 202 may be configured to, when watchdog timer 201 elapses, perform the determination of whether the input data received from the second electronic device 102 at the end of the daisy chain through the MISO port matches the expected data. SPI interface circuit 202 may be configured to take any suitable corrective action if the expected data does not match the received data.

SPI interface circuit 202 may be configured to determine to set electronic devices into a normal mode and cause the electronic devices to exit the daisy chain mode. SPI interface circuit 202 may be configured to, based on the determination to set electronic devices 102 into the normal mode and exit the daisy chain mode, issue a second changed edge on the CS port, wherein the second changed edge is from the second level to the first logic level. SPI interface circuit 202 may be configured to output a default value, such as zero, to the MOSI port after sending of the first changed edge on the CS port and before watchdog timer 201 has elapsed.

Figure 3:
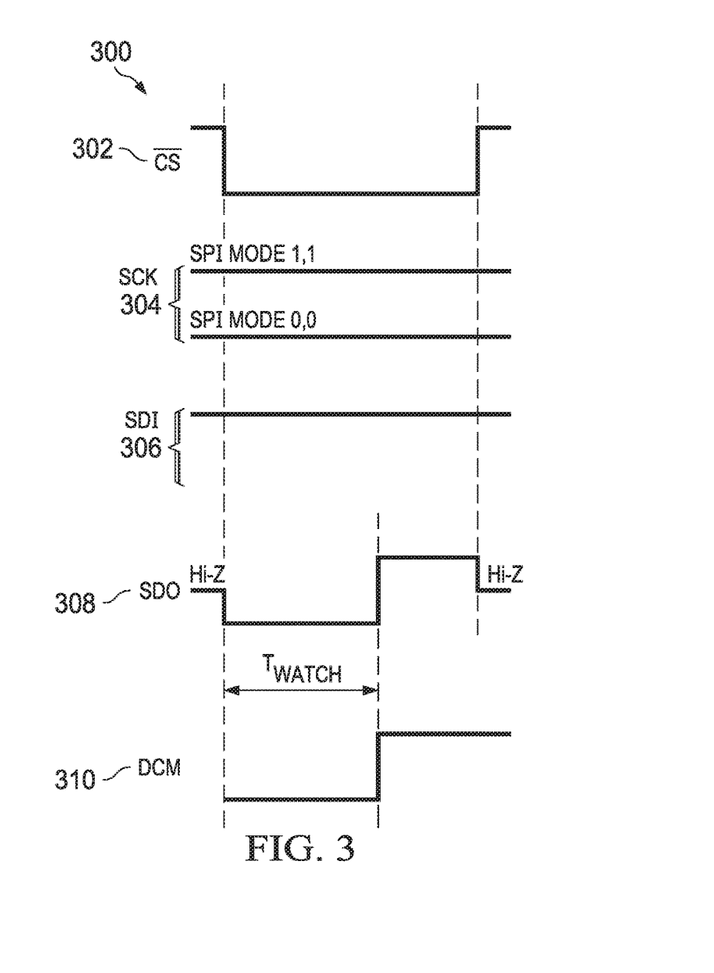
FIG. 3 is an illustration of timing diagrams of entry into a daisy chain mode, according to embodiments of the present disclosure

FIG. 3 is an illustration of timing diagrams of entry into a daisy chain mode, according to embodiments of the present disclosure. The illustrations of FIG. 3 may depict such an entry for an instance of electronic device 102 (such as electronic device 102A).

Graph 302 illustrates a plot of an nCS signal received by electronic device 102. The nCS signal may be high (a logic one) initially. A falling edge of the nCS signal may be issued by MCU 101, wherein the nCS signal transitions to a low value (a logic zero). This may be detected at electronic device 102. This may initiate a process by electronic device 102 of determining whether to enter daisy chain mode. Later, a rising edge of the nCS signal may be issued by MCU 101 and detected at each electronic device 102. Upon the falling edge of the nCS signal, watchdog timer 203 may be set.

Graph 304 illustrates a plot of an SCK signal issued by MCU 101 and detected at each electronic device 102. In the example of FIG. 3, the SCK signal may remain constant, whether logically high or low. By the SCK signal remaining unchanged, electronic device 102 may be configured to enter daisy chain mode after expiration of a defined time delay or period. The default value of the unchanged SCK signal may be zero or one.

Graph 306 illustrates a plot of signals received on the SDI port of electronic device 102. The value of the signal on the SDI port may be provided by MCU 101 or by another instance of electronic device 102 in the position immediately up-chain in the daisy chain of electronic devices 102. The constantly high value of SDI in the simple example of FIG. 3 may represent a "1" to be written. Electronic device 102 may write a "1" to a designated area (if a write command is assumed) and propagate the "1" to other instances of electronic device 102 through its SDO port, described in more detail below.

Graph 308 illustrates a plot of an output signal written to the SDO port of electronic device 102. Before the falling edge of nCS is detected, and after the rising edge of nCS is detected, a high-impedance value may be output by electronic device 102 on its SDO port, denoted by "Hi-Z" in FIG. 3. The high-impedance value may signal that the SDO port is not held to a particular value. Furthermore, upon detection of the falling edge of nCS, a default value may be output by electronic device 102 on its SDO port. Such a default value may be, for example, zero. The default value may continue to be output by electronic device 102 on its SDO port until the expiration of watchdog timer 203 in electronic device 102. As discussed above, the period counted by watchdog timer 203 may be given as TWatch. Upon expiration of watchdog timer 203, after a duration of TWatch, electronic device 102 may enter daisy chain mode. Thereafter, electronic device 102 may output the value received on its SDI port to its SDO port. This may be a logic "one". TWatch may be of any suitable duration. TWatch may be typically much longer than a given period of a SCK clock cycle. Accordingly, when electronic device 102 is in a normal mode of operation, a lack of a changed edge of a SCK signal during a single SCK signal cycle will not trigger an expiration of TWatch and erroneously end the normal mode of operation. An SCK signal may have a frequency of, for example, 20 MHz, corresponding to a period of 50 ns. TWatch may be, for example, 1,000 times as long as the SCK signal period, such as 50 microseconds. The longer TWatch is in relation to the period of the SCK signal, the less perturbation may occur with regards to a normal mode of operation. Conversely, selection of TWatch may limit how slow the SCK signal may be, as similar values of TWatch and the period of the SCK signal may cause such perturbation.

Graph 310 illustrates whether electronic device 102 is in daisy chain mode. Thus, upon the falling edge of nCS, electronic device 102 is not in daisy chain mode. However, after expiration of watchdog timer 203, electronic device 102 might be in daisy chain mode.

At the end of the daisy chain, MCU 101 may receive the data sent by SDO back to the MISO port of MCU 101. MCU 101 may verify proper transmission in the chain by reading the data returned and verifying that the same values that were transmitted have been received. Because each electronic device 102 copies the signal from its SDI port to its SDO port as soon as the device is placed in daisy chain mode, the signal on the MISO port of MCU 101 may transition to logic high when all electronic devices 102 have been set in daisy chain mode. The duration of time to reach this point may be the maximum of all Twatch values from respective electronic devices 102. By detecting the transition to logic high when all electronic devices 102 have been set in daisy chain mode, MCU 101 may be configured to identify that all electronic devices 102 are properly configured for daisy chain mode. This identification may have the advantage of being performed without a proper bit transmission using a clocked interface, as the SCK is idle during this daisy chain mode entry sequence.

Figure 4:
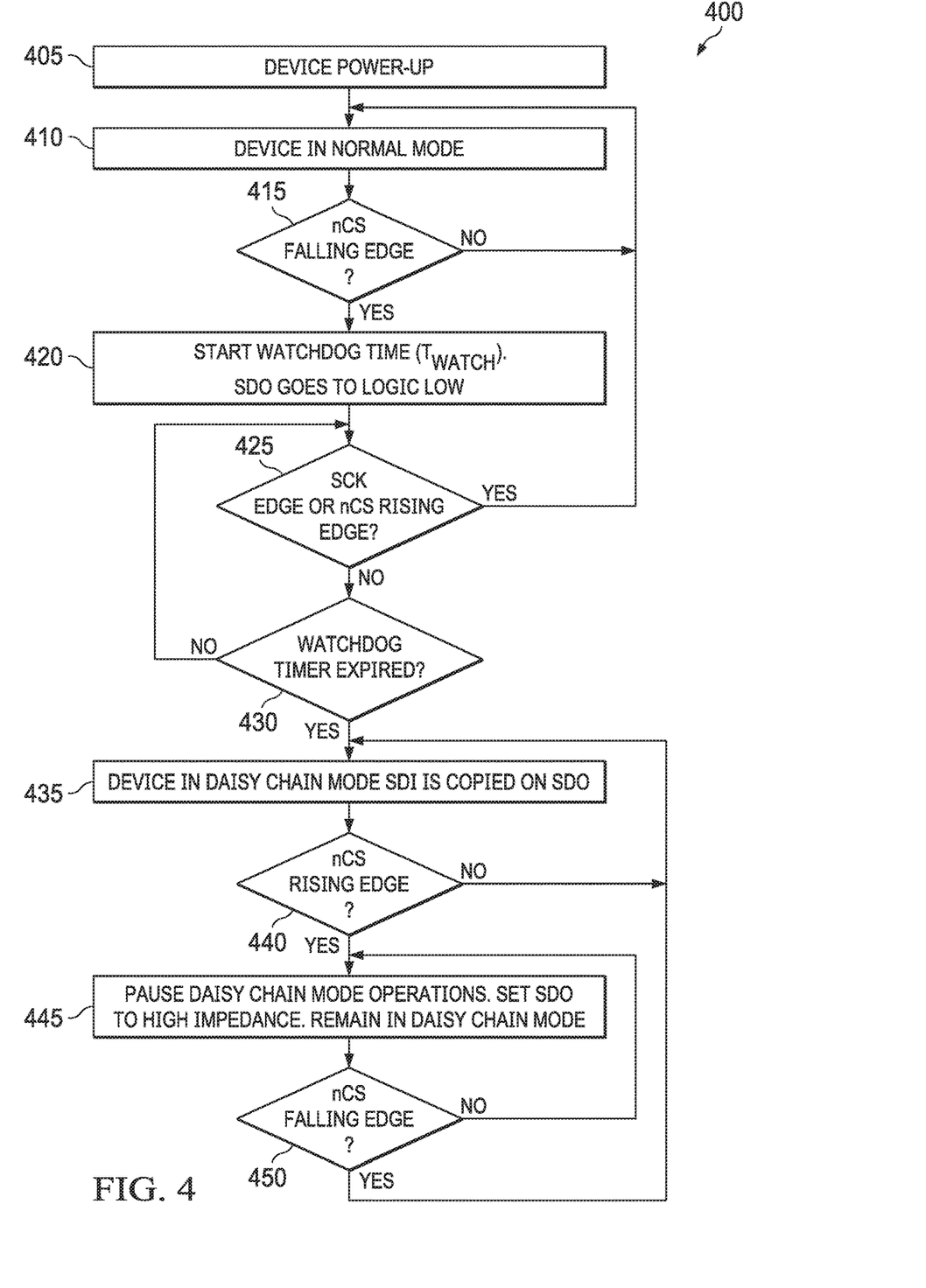
FIG. 4 is an illustration of operation of a method for daisy chain mode entry, according to embodiments of the present disclosure

FIG. 4 is an illustration of operation of a method 400 for daisy chain mode entry, according to embodiments of the present disclosure. In particular, method 400 may illustrate operation of electronic device 102 as a slave node. Method 400 may be implemented within, for example, SPI interface circuit 204. Method 400 may include fewer or more states, may enter states in a different order, repeat states, or enter different state paths in parallel with respect to one another. Method 400 may be implemented by, for example, a state machine in SPI interface circuit 204. Method 400 may begin at any suitable step, such as step 405.

At step 405, the electronic device, such as electronic device 102, may power-up. After performing any necessary boot or start-up tasks, method 400 may enter step 410. Step 410 may reflect normal operation for electronic device 102, when electronic device 200 is not propagating its inputs on its SDI port to its outputs on its SDO port in a daisy chain manner. SPI interface circuit 204 may apply a high impedance to its SDO port while an nCS signal is kept logic high, meaning that electronic device 102 is unselected for daisy mode configuration. The same SDO port may be used by other portions of electronic device 102 for communication or any other suitable purpose.

At step 415, SPI interface circuit 204 may be configured to determine whether the nCS port has a changed edge, such as a falling edge. If so, method 400 may proceed to step 420. Otherwise, method 400 may return to step 410 to continue to operate in normal mode until such a changed edge on the nCS port is observed.

At step 420, a watchdog timer, such as watchdog timer 203, may be initiated or otherwise set. Watchdog timer 203 may be configured to expire after a period of TWatch. The output on the SDO port of electronic device 102 may be set to a default value, such as a low logic value. Then, method 400 may proceed to step 425.

At step 425, it may be determined whether a changed edge has been observed on signals on the nCS or SCK ports. The changed edge may include a rising edge signal on the nCS port, or any clock pulse on the SCK port. Any rising or falling edge on the SCK port or on the nCS port may indicate that MCU 101 is switching to a normal mode of operation and the daisy chain mode is aborted. If such a changed edge has been observed, then method 400 may return to step 410 and stop waiting for expiration of watchdog timer 203. Otherwise, method 400 may proceed to step 430.

At step 430, it may be determined whether watchdog timer 203 has expired, wherein a duration of time has elapsed as defined by the period TWatch that was set in step 420. If so, method 400 may proceed to step 435. Otherwise, method 400 may return to step 425.

At step 435, the electronic device may be set in daisy chain mode and thereafter operating in daisy chain mode. The electronic device may copy the signal on its SDI port to its SDO port.

At step 440, it may be determined whether there is a changed edge on the nCS port, such as a rising edge signal. If so, in one embodiment, method 400 may proceed to step 445. In such an embodiment, an nCS changed signal may cause pausing of daisy chain mode operations, such as outputting data received on an SDI port to an SDO port. Otherwise, method 400 may return to step 435.

At step 445, electronic device 102 may still be in daisy chain mode as it has been properly set in the steps above. Electronic device 102 may receive new commands and execute the commands per the daisy chain protocol. This may continue until the daisy chain mode is to be exited.

At step 450, electronic devices 102 may exit daisy chain mode based upon any suitable command or criteria. Although shown as following step 445, step 450 may be performed at any point during daisy chain mode in the method of FIG. 4.

Figure 5:
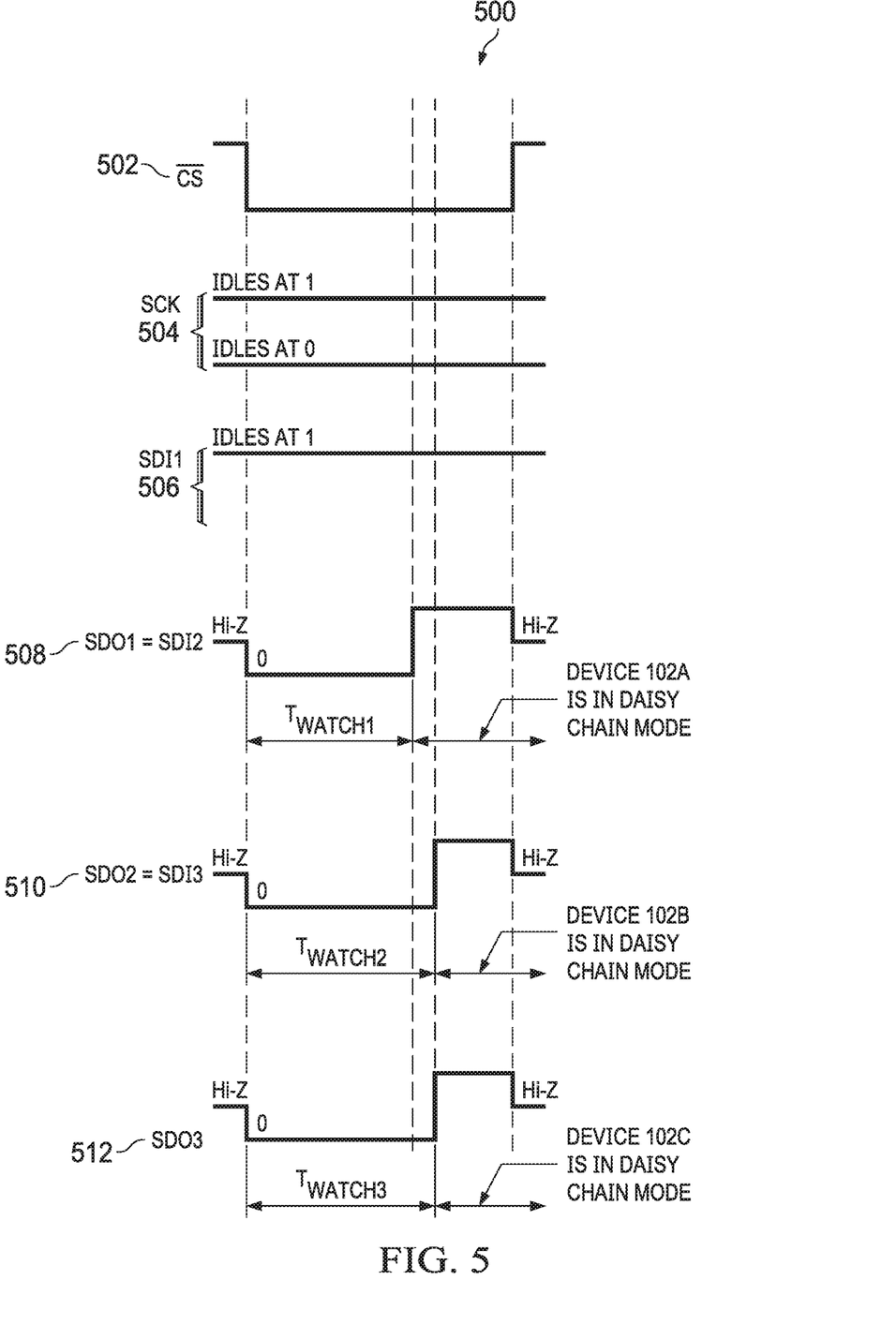
FIG. 5 is an illustration of timing diagrams of entry into a daisy chain mode for multiple instances of an electronic device, according to embodiments of the present disclosure.

FIG. 5 is an illustration of timing diagrams of entry into a daisy chain mode for multiple instances of electronic device 102, according to embodiments of the present disclosure. The illustrations of FIG. 3 may depict such an entry for three instances of electronic device 102 such as electronic device 102A, electronic device 102B, and electronic device 102C.

Graph 502, similar to graph 302, illustrates a plot of an nCS signal received by each of electronic devices 102. The nCS signal may be high (a logic one) initially. A falling edge of the nCS signal may be issued by MCU 101, wherein the nCS signal transitions to a low value (a logic zero). This may be detected at each of electronic devices 102. This may initiate a process by each of electronic devices 102 to determine whether to enter daisy chain mode. Later, a rising edge of the nCS signal may be issued by MCU 101 and detected at each of electronic devices 102. Upon the falling edge of the nCS signal, a watchdog timer 203 in each of electronic devices 102 may be set.

Graph 504, similar to graph 304, illustrates a plot of an SCK signal issued by MCU 101 and detected at each of electronic devices 102. In the example of FIG. 5, the SCK signal may remain constant, whether logically high or low. By SCK remaining unchanged, electronic devices 102 may be configured to enter daisy chain mode after expiration of a defined time delay or period.

Graph 506 illustrates a plot of signals received on the SDI port of electronic device 102A (denoted as SDI1). The value of the signal on the SDI port may be provided by MCU 101. The constantly high value of SDI may represent a "1" to be written. Electronic device 102A may write a "1" to its designated write destination and propagate the "1" to other instances of electronic device 102 through its SDO port, described in more detail below.

Graph 508 illustrates a plot of an output signal written to the SDO port of electronic device 102A (denoted as SDO1). Such a signal may be received on the SDI port of electronic device 102B (denoted as SDI2). Before the falling edge of nCS is detected, and after the rising edge of nCS is detected, a high-impedance value may be output by electronic device 102A on SDO1, denoted by "Hi-Z". Furthermore, upon detection of the falling edge of nCS, a default value may be output by electronic device 102A on SDO1. Such a default value may be, for example, zero. The default value may continue to be output by electronic device 102A on SDO1 until the expiration of the particular watchdog timer 203 in electronic device 102A. As discussed above, the period determined, timed, or counted by watchdog timer 203 may be given as TWatch. The specific period determined, timed, or counted by each different instance of watchdog timers 203 in electronic devices 102 may be the same or different. In one embodiment, each of watchdog timers 203 may have a different value for TWatch. Differences between values for TWatch may arise from, for example, device mismatches. However, if these TWatch For example, watchdog timer 203 of electronic device 102A may be set to determine, time, or count for a period defined by TWatch1, watchdog timer 203 of electronic device 102B may be set to determine, time, or count for a period defined by TWatch2, and watchdog timer 203 of electronic device 102C may be set to determine, time, or count for a period defined by TWatch3. Each of TWatch1, TWatch2, and TWatch3 may be initiated by respective watchdog timers 203 upon a falling edge of the nCS signal.

Upon expiration of watchdog timer 203 in electronic device 102A, after TWatch1 has elapsed, electronic device 102A may enter daisy chain mode. Thereafter, electronic device 102A may output the value received on SDI1 to SDO1, received in turn by electronic device 102B on SDI2. This may be a logic "one".

Graph 510 illustrates a plot of an output signal written to the SDO port of electronic device 102B (denoted as SDO2). Such a signal may be received on the SDI port of electronic device 102C (denoted as SDI3). Before the falling edge of nCS is detected, and after the rising edge of nCS is detected, a high-impedance value may be output by electronic device 102B on SDO2, denoted by "Hi-Z". Furthermore, upon detection of the falling edge of nCS, a default value may be output by electronic device 102B on SDO2. Such a default value may be, for example, zero. The default value may continue to be output by electronic device 102B on SDO2 until the expiration of the particular watchdog timer 203 in electronic device 102B. As discussed above, the period determined, timed, or counted by watchdog timer 203 in electronic device 102B may be given as TWatch2.

Upon expiration of watchdog timer 203 in electronic device 102B, after TWatch2 has elapsed, electronic device 102B may enter daisy chain mode. Thereafter, electronic device 102B may output the value received on SDI2 to SDO2, received in turn by electronic device 102C on SDI3. This may be a logic "one".

Graph 512 illustrates a plot of an output signal written to the SDO port of electronic device 102C (denoted as SDO3). Such a signal may be received on the SDI port of another electronic device 102 or the MISO port of MCU 101. Before the falling edge of nCS is detected, and after the rising edge of nCS is detected, a high-impedance value may be output by electronic device 102C on SDO3, denoted by "Hi-Z". Furthermore, upon detection of the falling edge of nCS, a default value may be output by electronic device 102C on SDO3. Such a default value may be, for example, zero. The default value may continue to be output by electronic device 102C on SDO3 until the expiration of the particular watchdog timer 203 in electronic device 102C. As discussed above, the period determined, timed, or counted by watchdog timer 203 in electronic device 102C may be given as TWatch3.

Upon expiration of watchdog timer 203 in electronic device 102C, after TWatch3 has elapsed, electronic device 102C may enter daisy chain mode. Thereafter, electronic device 102C may output the value received on SDI3 to SDO3. This may be a logic "one".

Upon expiration of all TWatch values (TWatch1, TWatch2, TWatch3), if, as in the FIG. 5, no SCK or nCS transition has been observed since the nCS falling edge, then a logic high signal is received on the MISO port of MCU 101. This may indicate to MCU 101 that all electronic devices 102 have been properly set into daisy chain mode.

As the logic high signal is received on the MISO port of MCU 101 after the expiration of all TWatch values, then different Twatch may be used in electronic devices 102 without modifying the validity of the acknowledgement of the logic high signal on the MISO port of MCU 101.

Figure 6:
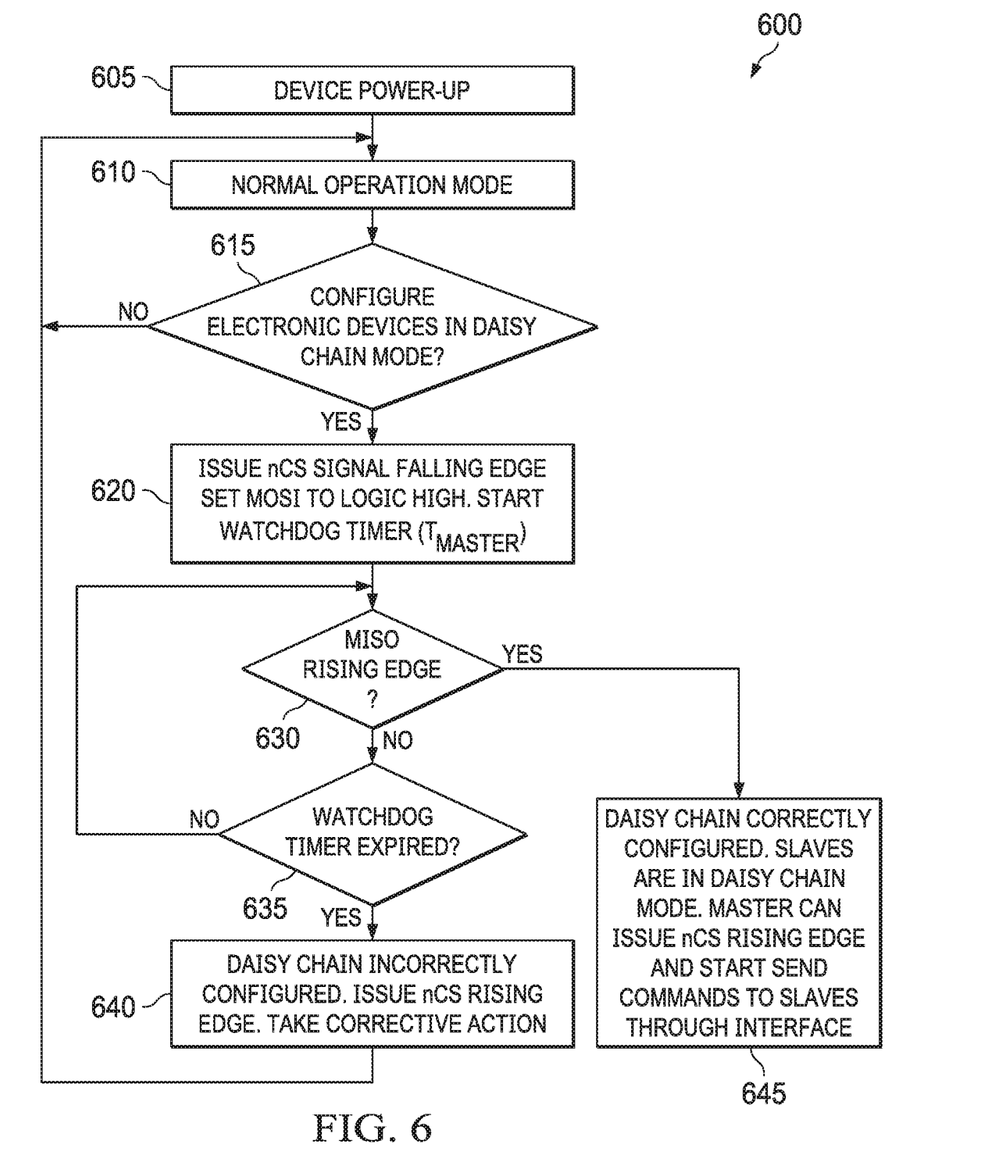
FIG. 6 is an illustration of operation of a method for daisy chain mode entry and command execution for a master control unit, according to embodiments of the present disclosure.

FIG. 6 is an illustration of operation of a method 600 for daisy chain mode entry and command execution for MCU 101, according to embodiments of the present disclosure. In particular, method 600 may illustrate operation of MCU 101 as a master node. MCU 101 may be implemented within, for example, SPI interface circuit 202. Method 600 may include fewer or more states, may enter states in a different order, repeat states, or enter different state paths in parallel with respect to one another. Method 600 may be implemented by, for example, a state machine in SPI interface circuit 202. Method 600 may begin at any suitable step, such as step 605.

At step 605, MCU 101 may power-up. After performing any necessary boot or start-up tasks, method 600 may enter step 610. Step 610 may reflect normal operation for MCU 101, when MCU 101 is not sending data to electronic devices 102 in a daisy chain manner, nor receiving such data propagated in a daisy chain manner.

At step 615, SPI interface circuit 202 may be configured to determine whether to put electronic devices 102 and itself into a daisy chain mode of operation based upon a needed daisy chain operation. Such a needed daisy chain operation may arise from, for example, a command, setting, or user input. If the system is to be put into a daisy chain mode of operation, method 600 may proceed to step 620. Otherwise, method 600 may return to step 610.

At step 620, SPI interface circuit 202 may be configured to set electronic devices 102 into daisy chain mode. SPI interface circuit 202 may issue a reset command, if needed, to electronic devices 102. SPI interface circuit 204 may issue an nCS signal, such as a falling edge, to electronic devices 102. The nCS signal may be issued first to electronic device 102A. Output on the MOSI port of MCU 101 may be set to logic high. A watchdog timer, such as watchdog timer 201 of MCU 101, may be set. The period for watchdog timer 201 may be given as TMaster. TMaster may be larger than the maximum of the TWatch values of electronic devices 102. This may facilitate an acknowledgment signal, such as a logic high value on the MISO port of MCU 101, when each of electronic devices 102 has successfully propagated its SDI input to its SDO port when in daisy chain mode. SPI interface circuit 202 may issue the command and any data, if needed. For example, SPI interface circuit 202 may issue a write command and the data to be written.

At step 630, it may be determined whether a rising edge has been received on the MISO port of MCU 101. Such a rising edge may indicate that signals have been successfully propagated through the daisy chain of electronic devices 102. If the rising edge has been received on the MISO port of MCU 101, method 600 may proceed to step 645. Otherwise, method 600 may proceed to step 635.

At step 635, it may be determined whether TMaster has expired for watchdog timer 201. If not, method 600 may return to step 630. If so, method 600 may proceed to step 640.

At step 640, it may be determined that one or more problems exist with electronic devices 102 of the daisy chain, as the falling edge issued by SPI interface circuit 202 of MCU 101 on the nCS signal did not return back to MCU 101. One or more portions of electronic devices 102 of the daisy chain may be working incorrectly. Any suitable corrective action may be taken, such as issuing an alert, providing a notification to users of system 100, or performing individual diagnostics on different electronic devices 102. A changed edge on the nCS signal, such as a rising edge, may be sent to electronic devices 102. Method 600 may halt or return to step 610 to attempt to resend the entry mode sequence signals. Returning to step 610 may result in subsequently issuing another changed edge on the nCS signal, such as a falling edge, and then resending the data used for the previously attempted command.

At step 645, it may be determined that electronic devices 102 of the daisy chain are operational, working correctly, and configured to perform daisy chain operations as the series of electronic devices 102 correctly propagated data back to SPI interface circuit 204 of MCU 101. MCU 101 may then address commands and communications to the electronic devices 102 using any suitable daisy chain protocol.

Although not shown in FIG. 6, method 600 may return to normal mode from daisy chain mode, or from the process of configuring electronic devices 102 into daisy chain mode, upon any suitable criteria or condition. In such a case, method 600 may return to, for example, normal operation mode in step 610. MCU 101 may issue any suitable reset signal to electronic devices 102 before returning to step 610.

Although example embodiments have been described above, other variations and embodiments may be made from this disclosure without departing from the spirit and scope of these embodiments.

I claim:

1. An apparatus, comprising:
a serial data input port configured to receive input from a first electronic device;
a serial data output port configured to send output to a second electronic device;
a chip select input port configured to receive input from a master control unit;
a timer; and
an interface circuit, configured to:
in a daisy chain mode, copy data received at the serial data input port to the serial data output port;
upon receipt of a first changed edge of a chip select signal on the chip select input port, initiate the timer, wherein the first changed edge of the chip select signal is from a first logic level to a second logic level; and
upon the completion of a time to be determined by the timer, enter the daisy chain mode.

2. The apparatus of claim 1, wherein the interface circuit is further configured to exit the daisy chain mode based at least upon receipt of a second changed edge of the chip select signal on the chip select input port, wherein the second changed edge of the chip select signal is from the second logic level to the first logic level.

3. The apparatus of claim 1, wherein the timer is configured to be stopped based at least upon receipt of a second changed edge of the chip select signal on the chip select input port, wherein the second changed edge of the chip select signal is from the second logic level to the first logic level.

4. The apparatus of claim 1, wherein the interface circuit is further configured to output a default value to the serial data output port after receipt of the first changed edge of the chip select signal on the chip select input port and before the timer has determined the time to be determined.

5. The apparatus of claim 1, wherein:
the apparatus further includes a shared clock input port configured to receive a shared clock signal; and the interface circuit is further configured to enter the daisy chain mode based on a determination that the shared clock signal is unchanged while the timer is enabled and running.

6. The apparatus of claim 1, wherein the interface circuit is further configured to:
exit the daisy chain mode and enter a normal mode upon receipt of a second changed edge of the chip select signal on the chip select input port, wherein the second changed edge of the chip select signal is from the second logic level to the first logic level; and
in the normal mode after existing the daisy chain mode, apply a high impedance to the serial data output port.

7. The apparatus of claim 1, wherein the first electronic device and the master control unit are a same electronic device.

8. An apparatus, comprising:
a serial data output port configured to send output data to a first electronic device;
a serial data input port configured to receive input data from a second electronic device;
a chip select output port configured to send output to a plurality of electronic devices, the plurality of electronic devices connected in a daisy chain and including the first and second electronic devices;
an interface circuit, configured to:
determine whether to set the plurality of electronic devices into a daisy chain mode, wherein each electronic device of the plurality of electronic devices is configured to propagate received data from a previous electronic device in the daisy chain to a subsequent electronic device in the daisy chain;
based on the determination to set the plurality of electronic devices into the daisy chain mode, issue a first changed edge on a chip select signal on the chip select output port, wherein the first changed edge of the chip select signal is from a first logic level to a second logic level;
based on the determination to set the plurality of electronic devices into the daisy chain mode, send output data to be used in a command to the first electronic device through the serial data output port;
based on the determination to set the plurality of electronic devices into the daisy chain mode, initiate a timer;
when the timer elapses, determine whether the input data received from the second electronic device through the serial data input port matches an expected data, the expected data based on the output data; and
based on a determination that the input data matches the expected data, determine that the daisy chain is working correctly.

9. The apparatus of claim 8, wherein the interface circuit is further configured to
based on a determination that the input data does not match the expected data, determine that the daisy chain is working incorrectly.

10. The apparatus of claim 9, wherein the interface circuit is further configured to, based on the determination that the daisy chain is working incorrectly:
issue a second changed edge on the chip select signal on the chip select output port, wherein the second changed edge of the chip select signal is from the second logic level to the first logic level;
after issuing the second changed edge, issue a third changed edge on the chip select signal on the chip select output port, wherein the third changed edge of the chip select signal is from the first logic level to the second logic level;
after issuing the third changed edge, resend the output data to be used in the command to the first electronic device through the serial data output port.

11. The apparatus of claim 8, wherein the interface circuit is further configured to:
determine to set the plurality of electronic devices in a normal mode and cause the plurality of electronic devices to exit the daisy chain mode;
based on the determination to set the plurality of electronic devices in the normal mode and cause the plurality of electronic devices to exit the daisy chain mode, issue a second changed edge on the chip select signal on the chip select output port, wherein the second changed edge of the chip select signal is from the second logic level to the first logic level.

12. The apparatus of claim 8, wherein the interface circuit is further configured to output a default value to the serial data output port after sending the first changed edge of the chip select signal on the chip select input port and before the timer has elapsed.

13. A method, comprising:
receiving input from a first electronic device through a serial data input port;
sending output to a second electronic device through a serial data output port;
receiving input from a master control unit through a chip select input port;
in a daisy chain mode, copying data received at the serial data input port to the serial data output port;
upon receipt of a first changed edge of a chip select signal on the chip select input port, initiating a timer, wherein the first changed edge of the chip select signal is from a first logic level to a second logic level; and
upon the completion of a time to be determined by the timer, entering the daisy chain mode.

14. The method of claim 13, further comprising stopping the timer based at least upon receipt of a second changed edge of the chip select signal on the chip select input port, wherein the second changed edge of the chip select signal is from the second logic level to the first logic level.

15. The method of claim 13, further comprising:
receiving a shared clock signal; and
entering the daisy chain mode based on a determination that the shared clock signal is unchanged while the timer is enabled and running.

16. A method, comprising:
through a serial data output port, sending output data to a first electronic device;
through a serial data input port, receiving input data from a second electronic device;
through a chip select output port, sending output to a plurality of electronic devices, the plurality of electronic devices connected in a daisy chain and including the first and second electronic devices;
determining to set the plurality of electronic devices in a daisy chain mode, wherein each electronic device is configured to propagate received data from a previous electronic device in the daisy chain to a subsequent electronic device in the daisy chain;
based on the determination to set the plurality of electronic devices into the daisy chain mode, issuing a first changed edge on a chip select signal on the chip select output port, wherein the first changed edge of the chip select signal is from a first logic level to a second logic level;

based on the determination to set the plurality of electronic devices into the daisy chain mode, sending output data to be used in a command to the first electronic device through the serial data output port;

based on the determination to set the plurality of electronic devices into the daisy chain mode, initiating a timer; and when the timer elapses, determining whether the input data received from the second electronic device through the serial data input port matches an expected data.

17. The method of claim 16, further comprising:

determining to set the plurality of electronic devices in a normal mode and cause the plurality of electronic devices to exit the daisy chain mode; and based on the determination to set the plurality of electronic devices in the normal mode and cause the plurality of electronic devices to exit the daisy chain mode, issuing a second changed edge on the chip select signal on the chip select output port, wherein the second changed edge of the chip select signal is from the second logic level to the first logic level.

* * * * *